(12) United States Patent
Iglev et al.

(10) Patent No.: US 11,422,032 B2
(45) Date of Patent: Aug. 23, 2022

(54) MULTICOLOR OPTICAL RESONATOR FOR IMAGING METHODS

(71) Applicant: Technische Universität München, Munich (DE)

(72) Inventors: Hristo Iglev, Garching (DE); Oliver Hayden, Moosburg an der Isar (DE); Reinhard Kienberger, Garching (DE); Markus Wurzer, Munich (DE); Albert Schletter, Munich (DE); Johann Riemensberger, Eching (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 17/291,961

(22) PCT Filed: Oct. 25, 2019

(86) PCT No.: PCT/EP2019/079263
§ 371 (c)(1),
(2) Date: May 6, 2021

(87) PCT Pub. No.: WO2020/094429
PCT Pub. Date: May 14, 2020

(65) Prior Publication Data
US 2022/0003604 A1    Jan. 6, 2022

(30) Foreign Application Priority Data
Nov. 9, 2018  (EP) ..................... 18205407

(51) Int. Cl.
*G01J 3/45*    (2006.01)
*G01J 3/28*    (2006.01)
(Continued)

(52) U.S. Cl.
CPC .......... *G01J 3/2823* (2013.01); *G01N 21/031* (2013.01); *G02B 21/365* (2013.01); *G02B 26/001* (2013.01); *G01J 2003/2826* (2013.01)

(58) Field of Classification Search
CPC ...... G01J 3/51; G01J 3/513; G01J 3/50; G01J 3/46; G01J 3/02
(Continued)

(56) References Cited

U.S. PATENT DOCUMENTS 4,504,956 A  3/1985 Ream
5,381,232 A  1/1995 van Wijk
(Continued)

FOREIGN PATENT DOCUMENTS

DE    102014220282 A1  4/2016
WO    WO-2013/164642 A1  11/2013
WO    WO-2018/106321 A1  6/2018

OTHER PUBLICATIONS

Arai et al., "Spectral Fingerprinting of Individual Cells Visualized by Cavity-Reflection-Enhanced Light-Absorption Microscopy," PLOS One, 13 pages (2015).
(Continued)

*Primary Examiner* — MD M Rahman
(74) *Attorney, Agent, or Firm* — Marshall, Gerstein & Borun LLP

(57) ABSTRACT

Disclosed herein is a device (100) for multicolor optical imaging of a sample (102) with wavelength-dependent optical path length enhancement, the device (100) comprising an optical resonator (106) for enhancing an optical path length, wherein the optical resonator (106) has a first finesse at a first wavelength and a second finesse at a second wavelength; a sample holder (104) for mounting the sample (102) in the optical resonator (106), wherein the sample holder (104) is configured to hold the sample (102) such that an
(Continued)

Figure 1:
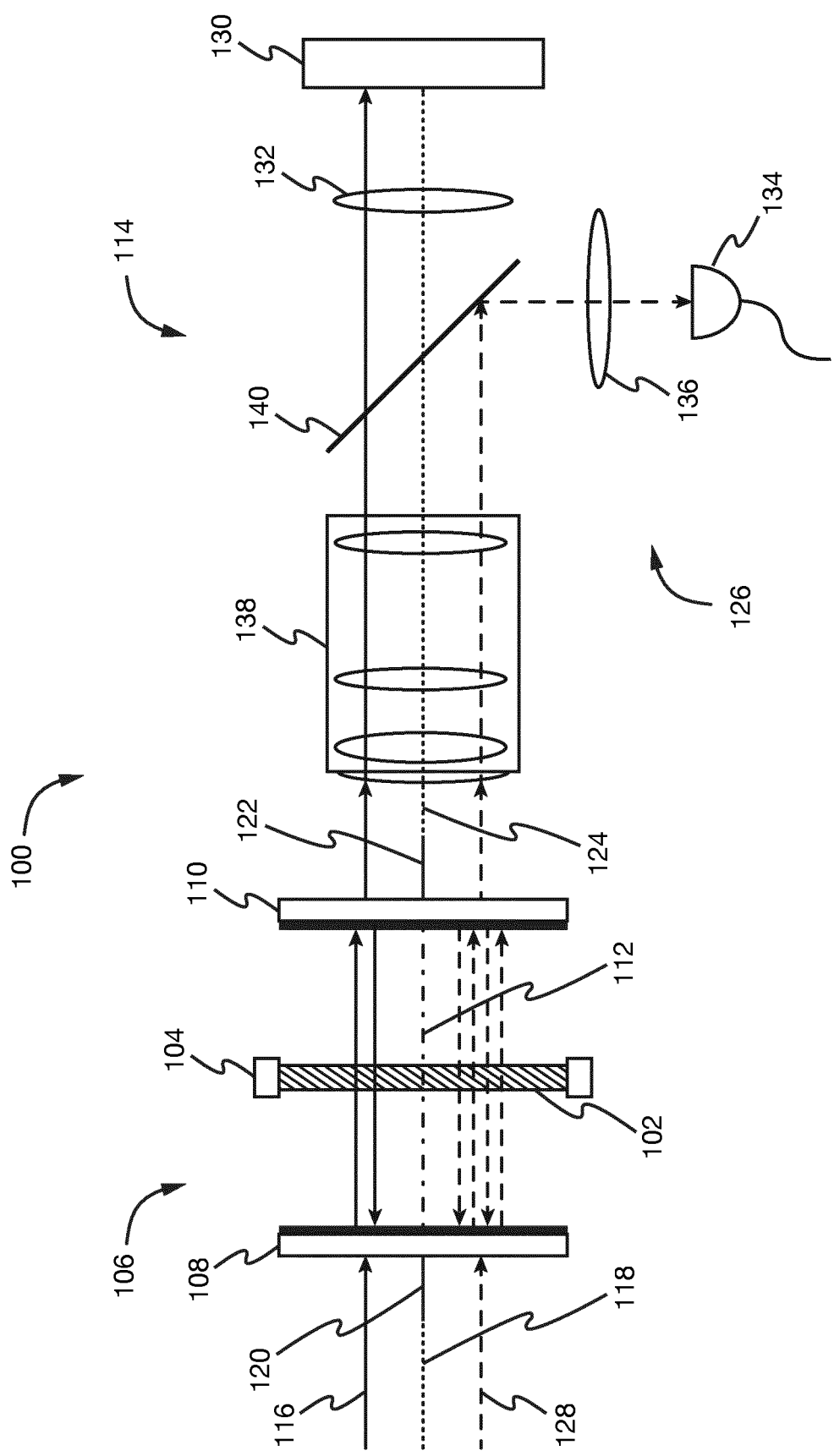

optical axis (112) of the optical resonator (106) intersects with the sample (102);a first imaging system (114) for imaging the sample (102) at the first wavelength with a first imaging technique, and a second imaging system (126) for imaging the sample (102) at the second wavelength with a second imaging technique, wherein the second wavelength is different from the first wavelength; wherein the first finesse and the second finesse are chosen such that the optical resonator (106) enhances a first image quality indicator of the imaging with the first imaging system (114) and a second image quality indicator of the imaging with the second imaging system (126).

20 Claims, 4 Drawing Sheets

(51) Int. Cl.
*G01N 21/03* (2006.01)
*G02B 21/36* (2006.01)
*G02B 26/00* (2006.01)

(58) Field of Classification Search
USPC .......................................................... 356/456
See application file for complete search history.

(56) References Cited

U.S. PATENT DOCUMENTS

| | | |
|---|---|---|
| 5,528,040 A | 6/1996 | Lehmann |
| 2014/0320856 A1 | 10/2014 | McKeever et al. |
| 2017/0261739 A1 | 9/2017 | Juffmann et al. |

OTHER PUBLICATIONS

Cuche et al., "Simultaneous amplitude-contrast and quantitative phase-contrast microscopy by numerical reconstruction of Fresnel off-axis holograms," Applied Optics 38(34):6994-7001 (1999).
Freudiger et al., "Label-Free Biomedical Imaging with High Sensitivity by Stimulated Raman Scattering Microscopy," Science 322:1857-1861 (2008).
International Search Report and Written Opinion from International Application No. PCT/EP2019/079263 dated Nov. 28, 2019.
Juffmann et al., "Multi-pass microscopy," Nature Communications, 5 pages (2016).
Körner et al., "Compact Aberration-Free Relay-Imaging Multi-Pass Layouts for High Energy Laser Amplifiers," Appl. Sci. 6:343, 18 pages (2016).
Mader et al., "A scanning cavity microscope," Nature Communications, 7 pages (2015).
McGarvey et al., "Finesse and sensitivity gain in cavity-enhanced absorption sepctroscopy of biomolecules in solution," Optics Express 14(22):10441-10451 (2006).

MULTICOLOR OPTICAL RESONATOR FOR IMAGING METHODS

CROSS-REFERENCE TO RELATED APPLICATIONS

This is a U.S. National Phase of International Application No. PCT/EP2019/079263, filed Oct. 25, 2019, which claims priority to European Application No. 18205407.2, filed Nov. 9, 2018, the contents of which are incorporated herein by reference.

FIELD OF THE INVENTION

The present invention is in the field of optics. In particular, the invention relates to a device and a method for multicolor optical imaging of a sample with wavelength-dependent optical path length enhancement.

BACKGROUND

Optical imaging is employed for a wide range of applications, e.g. for optical microscopy of mesoscopic objects like thin-film solid state structures or biological cells as well as for optical spectroscopy of chemical or biological samples. Correspondingly, a large variety of imaging techniques has been developed, which are adapted for different purposes. These include for example absorption imaging for samples with spatially varying absorption properties and phase contrast imaging for samples with a spatially varying refractive index as well as fluorescence spectroscopy of fluorophore-labeled objects and Raman spectroscopy for probing of vibrational spectra.

While spectacular progress has been made in recent years, e.g. in terms of spatial resolution with the advent of super-resolution microscopy, many imaging techniques are limited to optically dense samples, which interact strongly with incident light. This holds in particular for samples with a low damage threshold, for which the light intensity e.g. for illumination or resonant excitation is limited to low intensities in order to avoid damage to the sample. This is frequently the case when studying biological samples. For this reason, imaging of samples with a low optical density, e.g. thin samples like adherent single-cell layers as well as cells or cell aggregates in flow, can be challenging, in particular if the thickness of the sample cannot be increased, for example if properties of individual cells are to be studied, e.g. metabolic conditions or chemical/biochemical changes due to interactions with the cellular environment.

One approach to overcome this limitation is to employ optical resonators, in which light coupled into the resonator is reflected back and forth multiple times before leaving the resonator. Thereby, the effective optical path length through a sample placed in the resonator can be increased as the light passes through the sample repeatedly, leading to an enhanced interaction between the light and the sample, e.g. a larger absorption, scattering and/or phase shift of the light. This concept is for example used in scanning cavity microscopy, which relies on an optical microcavity formed between the tip of an optical fiber and a sample holder to enhance a detection signal, see e.g. M. Mader et al., *Nat. Commun.* 6:7249 (2015). As the light field within the microcavity is localized to a small volume, only a single point of the sample can be probed with this technique and the fiber tip has to be scanned over the sample to obtain a complete image such that the use of this technique is typically restricted to static samples.

To directly image extended samples inside an optical resonator, resonators with focusing elements like lenses or curved mirrors have been employed, wherein the focusing elements are configured to image the sample onto itself, allowing for sharp images independent of the number of round trips that the imaging light performs in the resonator, see e.g. Y. Arai et al., *PLoS ONE* 10(5):e0125733 (2015), T. Juffmann et al., *Nat. Commun.* 7:12858 (2016) and US 2017/0261739 A1. This, however, requires complicated resonator configurations, which can be difficult to align. Moreover, one particular drawback of these methods is the fact that the image quality strongly depends on the imaging technique that is used, which can prevent simultaneous use of different imaging techniques.

WO 2013/164642 A1 describes a device for chemical sensing using an optical microcavity. The device comprises a cavity connected to channels for providing a sample medium. Light from a radiation source is coupled into the cavity and light transmitted through the cavity is detected by a detector. The optical path length of the cavity is tunable and on the micrometer scale such that the free spectral range is sufficiently large so that only a single longitudinal cavity mode is resonant with the light emitted by the radiation source.

Devices for cavity ring down spectroscopy are known from WO 2018/106321 A1 and U.S. Pat. No. 5,528,040 A.

SUMMARY OF THE INVENTION

The object of the invention is thus to provide a device and a method for imaging of a sample with optical path length enhancement that facilitates simultaneous imaging with different imaging techniques. This object is met by a device and a method according to claims 1 and 21, respectively. Embodiments of the present invention are detailed in the dependent claims.

The device for multicolor optical imaging of a sample with wavelength-dependent optical path length enhancement comprises: (a) an optical resonator for enhancing an optical path length, wherein the optical resonator has a first finesse at a first wavelength and a second finesse at a second wavelength; (b) a sample holder for mounting the sample in the optical resonator, wherein the sample holder is configured to hold the sample such that an optical axis of the optical resonator intersects with the sample; (c) a first imaging system for imaging the sample at the first wavelength with a first imaging technique, wherein the imaging is performed along an outgoing optical axis of the optical resonator; and (d) a second imaging system for imaging the sample at the second wavelength with a second imaging technique, wherein the imaging is performed along an outgoing optical axis of the optical resonator and wherein the second wavelength is different from the first wavelength. The first finesse and the second finesse are chosen such that the optical resonator enhances a first image quality indicator of the imaging with the first imaging system and a second image quality indicator of the imaging with the second imaging system.

The optical resonator can be formed by two or more reflective surfaces, e.g. mirrors. Light propagating along an optical axis of the optical resonator is reflected by the reflective surfaces such that the light continues to propagate along the optical axis of the optical resonator. The optical axis of the resonator forms a closed path, along which the light continuously traverses. Thereby, the light can be confined to the optical resonator, in which it can propagates in a cyclic fashion. In order to couple light into the optical resonator, the optical resonator can comprise at least one partially reflective surface, through which light can be partially transmitted. In turn, a fraction of the light propagating in the optical resonator can be transmitted through the partially reflective surface in each cycle and thus can leave the optical resonator along an outgoing optical axis of the optical resonator. Each photon coupled into the optical resonator can thus perform a number of round trips before being emitted from the resonator such that the effective optical path length of the resonator, i.e. the optical path length that the photon travels within the resonator, can be enhanced compared to the physical length and optical path length of the resonator. Here, the physical length of the resonator refers to the length of the closed path formed by the optical axis of the resonator, whereas the optical path length additionally takes into account the refractive index along the optical axis of the resonator. The enhancement of the optical path length can be characterized by a finesse of the optical resonator. As detailed below, the finesse is defined as the ratio of the free spectral range of the optical resonator and the full width at half maximum (FWHM) of the peaks in the transmission spectrum of the optical resonator.

By mounting the sample in the sample holder in such a way that the optical axis of the resonator intersects with the sample, light confined in the resonator passes through the sample each cycle, thereby enhancing effective optical path length within the sample, leading to a stronger interaction between the light and the sample. The first imaging system is configured to image the sample with a first imaging technique by collecting light with the first wavelength that is emitted from the resonator along an outgoing optical axis. Correspondingly, the second imaging system is configured to image the sample with the second imaging technique by collecting light with the second wavelength that is emitted from the resonator along an outgoing optical axis. The outgoing optical axes used by the first and second imaging system, respectively, may be different from each other if the optical resonator has multiple outgoing optical axes, e.g. if the optical resonator comprises multiple partially reflective surfaces.

At the first wavelength, the optical resonator has the first finesse, which characterizes the average number of round trips in the optical resonator for photons with the first wavelength. The first finesse is adapted to the first imaging system in order to enhance the first image quality indicator, which quantifies a quality of an image of the sample taken with the first imaging system. Here, enhancing the first image quality factor refers to a situation, wherein the first image quality factor is higher if the optical resonator is in place than if the optical resonator is removed from the device, e.g. by making the corresponding reflective surfaces perfectly transparent. The finesse can be the determining factor for the image quality and in particular may have different optimal values for different imaging systems. In one example, a very large finesse may be advantageous, e.g. to increase the strength of a signal by increasing the number of round trips through the sample. In another example, a small finesse may lead to a better image quality, e.g. to avoid phase noise or a reduction in sharpness due to the overlapping of signals originating from parts of the light that have performed different numbers of round trips. In yet another example, an intermediate value of the finesse may provide the best image quality due to an enhanced effective optical path length through the sample while avoiding a deterioration of the image quality at larger finesse values e.g. due to the aforementioned effects.

Correspondingly, the optical resonator exhibits the second finesse at the second wavelength, which in turn characterizes the average number of round trips in the optical resonator for photons with the second wavelength. The second finesse is adapted to the second imaging system in order to enhance the second image quality indicator, which quantifies a quality of an image of the sample taken with the second imaging system. In particular, the second finesse may be different from the first finesse e.g. if different imaging techniques are used with different requirements with respect to the finesse.

By choosing the finesse of the optical resonator appropriately for both the first and the second imaging system, the image quality of the two systems can be enhanced simultaneously. This facilitates the implementation of different imaging techniques within the same device, while taking advantage of the improvement in image quality that the optical resonator can offer due to the enhancement of the effective optical path length within the sample. Thereby, the amount of information that can be extracted from the imaging can be increased, in particular when combining the information from measurements taken with the two different imaging systems.

The first image quality indicator and the second image quality indicator can for example be a signal strength, a signal-to-noise ratio, a contrast ratio, an edge contrast or a combination thereof. The signal strength can be an absolute strength of a measured signal, e.g. a measured intensity, phase shift or polarization angle, or a relative strength of a measured signal, for example a ratio between measured intensities, e.g. for different polarizations, at different wavelengths and/or at different positions in the sample. Correspondingly, a signal-to-noise ratio can be defined as the ratio of the signal strength and a measure for the noise on the signal, e.g. a time-averaged, sample-averaged and/or measurement-averaged amplitude of fluctuations of the signal. For a spectroscopic imaging technique, a signal strength can for example be defined as the amplitude of a signal like an absorption or fluorescence peak. A signal-to-noise ratio for spectroscopic imaging techniques may e.g. be defined as the signal strength divided by an average noise on the signal at resonance, wherein the noise can e.g. be averaged over multiple measurements and/or over time. Similarly, for microscopic images a signal-to-noise ratio can e.g. be defined as the ratio of contributions to the image with long correlation lengths and contributions to the image with short correlation lengths, for example by defining a lower and an upper cut-off for spatial Fourier components of an image, wherein the lower and the upper cut-off are determined relative to a characteristic wave vector associated with a characteristic length scale of features in the sample. In one example, the lower cut-off may be 20% to 50% of the characteristic wave vector, whereas the upper cut-off may 2 to 5 times the characteristic wave vector. A contrast ratio of an image can e.g. be defined as the ratio of the highest and lowest intensity in the image, wherein the intensity may be averaged over a region comprising for example 4 to 25 pixels, e.g. to minimize the influence of noise. An edge contrast may for example be defined as a local contrast ratio in a subregion of an image or a ratio of an intensity at two adjacent points.

Enhancing the effective optical path length through the sample may be beneficial for a variety of imaging techniques, in particular microscopic imaging and spectroscopy, wherein microscopic imaging refers to spatially resolved measurements and spectroscopy refers to spectrally resolved measurements, which may or may not be spatially resolved. Each of the first and second imaging system can be configured to perform at least one of the following imaging techniques: absorption imaging, phase contrast imaging, fluorescence imaging, polarization imaging, photoacoustic imaging, absorption spectroscopy, fluorescence spectroscopy or Raman spectroscopy. In absorption imaging, spatial variations in the absorption of light by the sample are measured, which may e.g. result from resonant absorption or off-resonant scattering. Phase contrast imaging relies on a measurement of a phase, in particular a spatial variation of a phase difference, that light acquires when passing through the sample. For fluorescence imaging and spectroscopy, the sample is excited by light at a wavelength that is different from the wavelength at which the measurement is performed, wherein the measurement can e.g. be a spatially resolved image of the fluorescence intensity or a measurement of a spatially averaged fluorescence intensity, each of which may be performed at a fixed wavelength or spectrally resolved. Polarization imaging techniques probe the change of the polarization of light passing through the sample, e.g. using polarization optics like polarizers. In photoacoustic imaging, the sample is excited by an optical pulse, which induces fast heating of the sample, resulting in a jump in temperature and/or pressure. This can excite acoustic waves in the sample and can alter the refractive index of the sample, thereby changing the optical length of the optical resonator. This change can e.g. be detected by a change in the transmission at a probe wavelength, i.e. the first or second wavelength, which may be identical to the wavelength of the excitation pulse. Absorption spectroscopy measures spectral variations in the absorption of light by the sample or a part of the sample, which may e.g. result from resonant absorption or off-resonant scattering. Raman spectroscopy are spectrally resolved measurements of inelastic scattering processes involving low-energy modes in the sample, e.g. rotational and vibrational degrees of freedom.

In a preferred embodiment, the first imaging technique is different from the second imaging technique. In one example, the first imaging technique may be fluorescence spectroscopy and the second imaging technique may be phase contrast imaging. In other embodiments, the first and the second imaging techniques may be the same, but are performed at different wavelengths. For example, the first and second imaging techniques may both be absorption imaging, but the first wavelength is in the ultraviolet spectrum, e.g. 350 nm, whereas the second wavelength is in the near-infrared spectrum, e.g. 1064 nm.

Preferably, the first finesse and the second finesse are chosen such that a combination of the first image quality indicator of the imaging with the first imaging system and the second image quality indicator of the imaging with the second imaging system is enhanced compared to an optical resonator with the second finesse at the first wavelength and the first finesse at the second wavelength. The combination of the first and second image quality indicators may e.g. be a sum or a weighted sum of the first and second image quality indicators. For example, the image quality of both the first and the second imaging system may be improved by increasing the finesse, but the image quality of the second imaging system may deteriorate if the second finesse exceeds a certain threshold. In this case, it may be advantageous to choose a larger value for the first finesse than for the second finesse. In another example, the image quality of both the first and the second imaging system may be improved by increasing the finesse, but the image quality of the second imaging system may improve more slowly. In this case, it may also be advantageous to increase the first finesse at the expense of the second finesse.

The first finesse can for example be larger than 50, preferably larger than 100. A large finesse may in particular advantageous for spectroscopic imaging techniques, e.g. absorption or fluorescence spectroscopy, as the signal can be enhanced by a larger number of round trips of the light through the sample, while the overlapping of signals originating from parts of the light that have performed different numbers of round trips may have no detrimental effects, e.g. when measuring with a point-like detector like a photodiode.

In one example, the second finesse may be smaller than 10, preferably smaller than 5. This may for example be advantageous for spatially resolved imaging, in particular phase contrast imaging, as the image quality may deteriorate for larger values of the finesse as a result of the overlapping of signals originating from parts of the light that have performed different numbers of round trips, which may e.g. reduce the edge contrast and introduce phase noise.

In another example, the first finesse and the second finesse can be larger than 50, preferably larger than 100, and the first and second wavelengths can be separated by more than 50 nm, preferably more than 100 nm. Thereby, the imaging quality may e.g. be improved for spectroscopic measurements at two wavelengths with a large separation as the effective optical path length through the sample is enhanced strongly for both wavelengths simultaneously.

The finesse of the optical resonator is determined by loss processes in the optical resonator, which lead to a loss of light from the resonator, e.g. absorption and scattering processes. In particular, the reflectivity of the reflective surfaces forming the resonator can be of great relevance and may be chosen appropriately to achieve the desired finesse values. In one example, the optical resonator comprises a first and a second reflective surface. A reflectivity spectrum of the first and/or second reflective surface can be chosen such that the optical resonator exhibits the first and second finesse at the first and second wavelength, respectively. For example, the first mirror may exhibit a reflectivity greater than 99.9% at the first and second wavelength. If the first finesse is to be large, e.g. larger than 100, the reflectivity of the second mirror at the first wavelength may e.g. be chosen to be greater than 98%. If the second finesse is to be small, e.g. less than 5, the reflectivity of the second mirror at the second wavelength may e.g. be chosen to be smaller than 40%.

In one example, the effective optical path length of the optical resonator at the first and/or second wavelength can be smaller than five times, preferably smaller than two times the depth of field of the first and/or second imaging system, respectively. Here, the depth of field of an imaging system is defined as the Rayleigh length of a Gaussian laser beam at the respective wavelength focused onto the sample, wherein the waist of the laser beam at the focus is chosen such that the waist of the laser beam at a first aperture of the imaging system as seen from the sample, in particular a first lens of the imaging system is equal to the radius of the first aperture, e.g. the radius of the first lens. The effective optical path length of the optical resonator in turn is defined as the product of the finesse of the optical resonator at the respective wavelength and the length of the optical resonator. To achieve such an effective optical path length, the length of the optical resonator has to be sufficiently small. In one example, the length of the optical resonator may be smaller than 100 µm, preferably smaller than 10 µm.

The optical resonator can comprise at least one focusing element, wherein the at least one focusing element is configured to focus light propagating along the optical axis of the optical resonator such that a plane perpendicular to the optical axis of the optical resonator is imaged onto itself. For this, the at least one focusing element together with the reflective surfaces and other optical elements within the optical resonator can form an imaging system such that the intensity distribution in this plane perpendicular to the optical axis is the same after an integer number of round trips—up to a constant factor arising from loss processes. The at least one focusing element can for example be any number of refractive or diffractive focusing elements such as any number of convex and/or concave lenses. The at least one focusing element may e.g. be a pair of convex lenses, wherein the length of the optical resonator equals two times the sum of the focal lengths of the lenses. In other examples, at least one of the focusing elements may comprise at least one curved reflective surface, e.g. a curved mirror. The optical resonator may for example be a concentric, confocal, hemispherical or concave-convex two-mirror optical resonator. The optical resonator may in particular be configured to image a plane through the sample onto itself.

The device can further comprise at least one light source for generating light at the first and second wavelengths. The at least one light source may be formed by one or more coherent and/or incoherent light sources. The device may for example comprise a single light source with a broadband spectrum, e.g. a white LED or a supercontinuum laser, which may e.g. be filtered to obtain light at the first and second wavelengths. In another example, the device may comprise two narrowband light sources, e.g. lasers or narrowband LEDs, one of which emits light at the first wavelength and the other one emits light at the second wavelength. The at least one light source may be a pulsed laser, in particular a pulsed laser with a pulse length that is smaller than a round trip time of the optical resonator.

An outgoing optical axis of the optical resonator can be parallel to an input optical axis for the imaging with the first and/or second imaging system, wherein the input optical axis is an axis of propagation of light that is to be coupled into the optical resonator, e.g. from the at least one light source. If the input optical axis is parallel to the outgoing optical axis, the light coupled into the optical resonator can propagate along the optical axis of the resonator, e.g. to ensure that the light propagates along the same path in each round trip. In other examples, the outgoing optical axis of the optical resonator can be tilted relative to an optical axis for the imaging with the first and/or second imaging system, e.g. by an angle of less than 15°, preferably less than 5°.

In a preferred embodiment, the sample holder comprises a fluid chamber configured to hold a liquid medium. The fluid chamber can be configured to hold the liquid medium such that the optical axis of the optical resonator intersects with the liquid medium in the fluid chamber. In one example, the fluid chamber may be a cylinder with flat top and bottom surfaces that are oriented perpendicular to the optical axis of the resonator. The cylinder may e.g. have an interior diameter between 10 nm and 5 mm and an interior height between 10 µm and 2 mm. The fluid chamber may for example consist of glass or plastic. The fluid chamber may be transparent at the first and second wavelength and thus may comprise an antireflection coating. Alternatively, the optical resonator may be formed by two opposing surfaces of the fluid chamber, in particular by two opposing interior surfaces of the fluid chamber, e.g. the inner top and bottom surfaces of a cylindrical fluid chamber. This may be advantageous to achieve a short length of the optical resonator. For this, the respective surfaces may be coated with a reflective coating, e.g. a metallic coating or a dielectric coating. To reduce the length of the optical resonator, the distance between the opposing surfaces, e.g. the inner top and bottom surfaces of a cylindrical fluid chamber, may be less than 100 µm, preferably less than 10 µm.

The device can further comprise a pump system, wherein the pump system is configured to create a flow of a liquid medium through the fluid chamber. To this end, the fluid chamber may e.g. comprise an input port and an output port, which are connected with the pump system. The fluid chamber and the pump system may be configured to create a laminar flow of the liquid medium through the fluid chamber. In a preferred embodiment, the fluid chamber and the pump system are configured to create a sheath flow through the fluid chamber, e.g. for hydrodynamic focusing. A sheath flow can be created by a parallel laminar flow of the liquid medium and a sheath medium, wherein the viscosity of the sheath medium is adapted to the viscosity of the liquid medium such that the two media do not mix. The two media can flow with different velocities, e.g. the sheath medium may be faster than the liquid medium. In another example, a viscoelastic liquid medium may be used, e.g. for viscoelastic flow focusing.

The device can also comprise a wavelength tuning apparatus for adjusting the first wavelength and/or the second wavelength. The wavelength tuning apparatus may for example be a tunable laser source or a tunable optical filter, e.g. a rotatable etalon filter. The wavelength tuning apparatus may comprise a feedback unit configured to stabilize the first and/or the second wavelength relative to a transmission peak of the optical resonator, e.g. via a Pound-Drever-Hall locking scheme.

Furthermore, the device can comprise an adjusting mechanism for adjusting a resonance frequency of the optical resonator. Here, a resonance frequency is a frequency at which the transmission spectrum of the optical resonator exhibits a local maximum. The adjusting mechanism may for example comprise an actuator, e.g. a piezo actuator, or a translation stage for moving one or more of the reflective surfaces forming the resonator in order to change the length of the resonator. Alternatively or additionally, the adjusting mechanism may comprise a refractive element for changing an optical length of the resonator, e.g. by changing an index of refraction of the refractive element or a propagation length through the refractive element.

The device can also comprise a third imaging system for imaging the sample with a third imaging technique, wherein the imaging is performed along an axis different from an outgoing optical axis of the optical resonator, in particular along an axis perpendicular to the optical axis of the optical resonator. The third imaging system can be configured such that it collects light from the resonator that does not leave through one of the reflective surfaces forming the resonator. For this, the third imaging system may e.g. be configured to image the sample under an angle relative to the optical axis of the optical resonator. The third imaging system may be configured to image at a third wavelength, which may be different from the first and second wavelengths, and may be configured to perform at least one of the following imaging techniques: absorption imaging, phase contrast imaging, fluorescence imaging, polarization imaging, photoacoustic imaging, absorption spectroscopy, fluorescence spectroscopy or Raman spectroscopy.

The device may also comprise a fourth imaging system for imaging the sample at a fourth wavelength with a fourth imaging technique, wherein the imaging is performed along an outgoing optical axis of the optical resonator. The fourth imaging system can be configured to perform at least one of the following imaging techniques: absorption imaging, phase contrast imaging, fluorescence imaging, polarization imaging, photoacoustic imaging, absorption spectroscopy, fluorescence spectroscopy or Raman spectroscopy. A finesse of the optical resonator at the fourth wavelength is chosen such that a fourth image quality indicator of the imaging with the fourth imaging system does not decrease due to the presence of the optical resonator. The fourth imaging technique may be different from the first and second imaging techniques.

The invention also provides a method for multicolor optical imaging of a sample with wavelength-dependent optical path length enhancement using a device according to any of the aforementioned embodiments. The method comprises (1) placing the sample in the optical resonator, wherein the sample is placed such that the optical axis of the optical resonator intersects with the sample; (2) imaging the sample at the first wavelength with the first imaging technique, wherein the imaging is performed along an outgoing optical axis of the optical resonator; and (3) imaging the sample at the second wavelength with the second imaging technique, wherein the imaging is performed along an outgoing optical axis of the optical resonator and wherein the second wavelength is different from the first wavelength. The first finesse and the second finesse are chosen such that the optical resonator enhances the first image quality indicator of the imaging with the first imaging technique and the second image quality indicator of the imaging with the second imaging technique. The numbering of the steps above is for clarity only and does not indicate a certain order of execution. As far as technically feasible, the steps can be permuted and the method and any embodiment thereof can be performed in an arbitrary order of these steps.

Each of the first and second imaging technique can be any one of the following imaging techniques: absorption imaging, phase contrast imaging, fluorescence imaging, polarization imaging, photoacoustic imaging, absorption spectroscopy, fluorescence spectroscopy or Raman spectroscopy. The first imaging technique can be different from the second imaging technique.

In a preferred embodiment, the sample comprises a liquid medium containing imaging objects, in particular individual biological cells or substances, and placing the sample in the optical resonator comprises providing the liquid medium in the fluid chamber. The liquid medium can for example comprise an isotonic fluid or a cell-culture medium that is configured to support biological cells. The liquid medium may also comprise a blood sample, in particular a diluted blood sample. The biological substances can for example be biomolecules like proteins or nucleic acids. In particular, the liquid medium may be configured to not alter optical and/or chemical properties of the imaging objects.

Providing the liquid medium in the fluid chamber can comprise creating a flow of the liquid medium through the fluid chamber. In particular, the flow of the liquid medium may be created and/or maintained while performing the imaging with the first and/or second imaging technique. Alternatively, the flow may be created to provide the liquid medium in the fluid chamber and may be interrupted while performing the imaging. The flow of the liquid medium through the fluid chamber may e.g. be a laminar flow. In one example, a sheath flow of the liquid medium and a sheath medium may be created in the fluid chamber, e.g. for hydrodynamic focusing. In another example, the liquid medium may be a viscoelastic medium, e.g. for viscoelastic flow focusing.

Placing the sample in the optical resonator can alter the optical properties of the resonator and in particular the finesse, the free spectral range and/or the optical length of the resonator, e.g. by scattering and/or absorption in the sample. Preferably, scattering and/or absorption by constituents of the sample other than imaging objects to be studied, e.g. the imaging object in the liquid medium, is minimized in order to not affect the intrinsic finesse of the optical resonator. For this, for example the liquid medium may for example be transparent and have a homogeneous index of refraction, in particular an index of refraction of less than 1.5. In one example, the first finesse of the optical resonator with the sample in place can be larger than 20, preferably larger than 50. Alternatively or additionally, the second finesse of the optical resonator with the sample in place can be smaller than 10, preferably smaller than 5.

In a preferred embodiment, the first and/or second wavelength is/are set to a corresponding peak of the transmission spectrum of the optical resonator. Thereby, the amount of light coupled into the optical resonator can be increased and be more robust against fluctuations in the first and/or second wavelength and/or in the transmission spectrum of the optical resonator. To this end, the method may further comprise adjusting the first wavelength, the second wavelength and/or the length of the optical resonator to tune a transmission of the optical resonator at the first wavelength and/or a transmission of the optical resonator at the second wavelength.

In one example, the first wavelength, the second wavelength and/or the length of the optical resonator may be adjusted to tune a transmission of the optical resonator at the first wavelength relative to a transmission of the optical resonator at the second wavelength. This may for example be used to adjust an intensity of the light used for the first and/or second imaging technique, e.g. to achieve similar intensities and/or signal strengths. In one example, the first wavelength may be set to a peak of the transmission spectrum of the optical resonator, whereas the second wavelength may be set to a point in the vicinity of a peak of the transmission spectrum of the optical resonator, at which the transmission is e.g. 50% of the peak transmission.

The method can also comprise imaging the sample with a third imaging technique, wherein the imaging is performed along an axis different from the outgoing optical axes of the optical resonator, in particular along an axis perpendicular to the optical axis of the optical resonator.

LIST OF FIGURES

Figure 2:
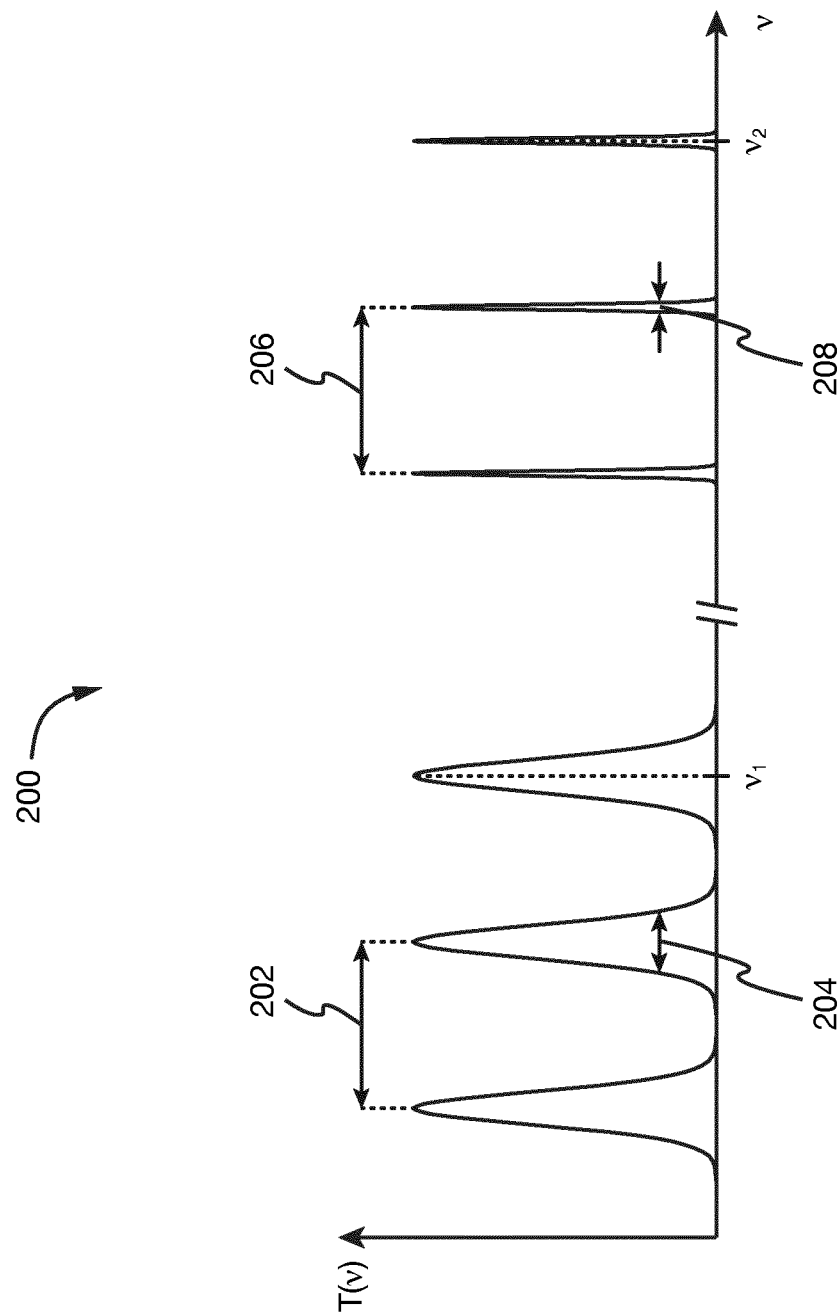
Figure 3A:
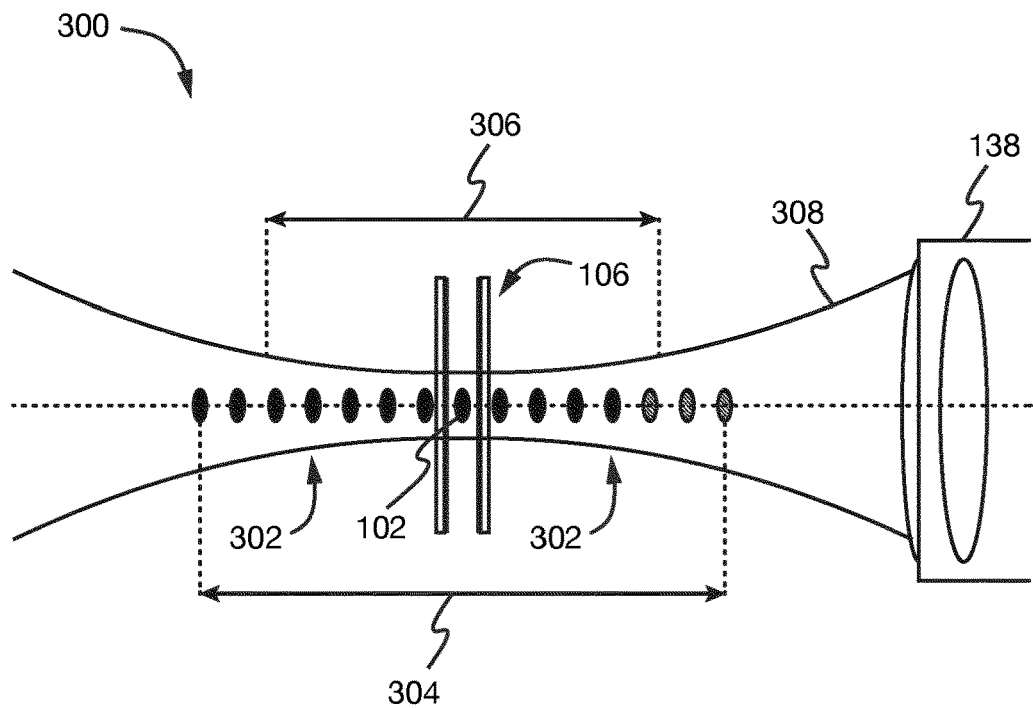
Figure 3B:
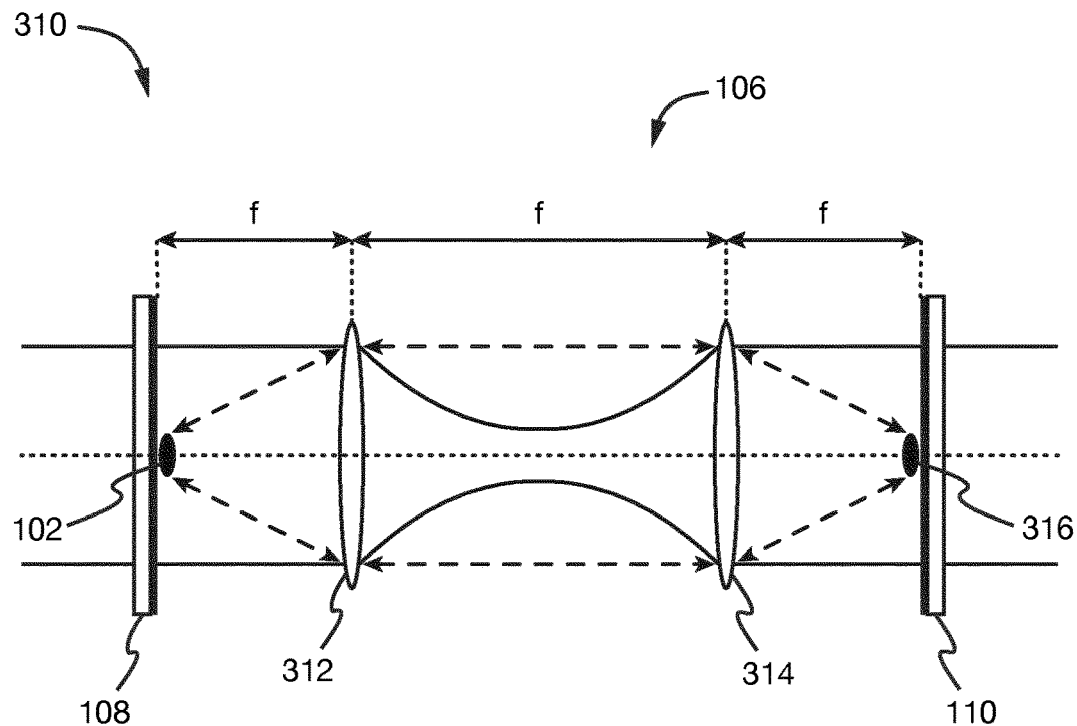
Figure 4:
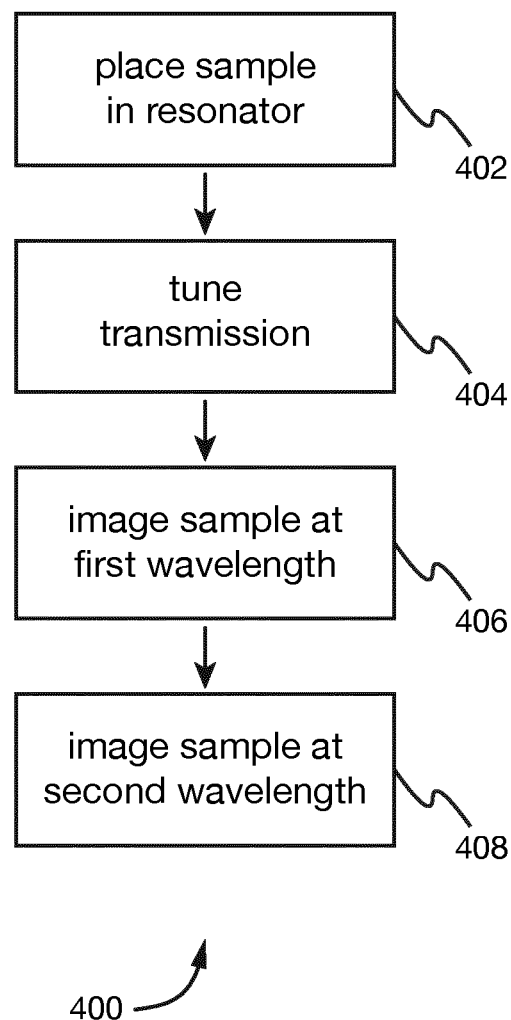

In the following, a detailed description of the invention and exemplary embodiments thereof is given with reference to the figures. The figures show schematic illustrations of FIG. 1: a device for multicolor optical imaging of a sample according to an exemplary embodiment of the invention;

FIG. 2: an example of a transmission spectrum of an optical resonator in a device in accordance with an embodiment of the invention;

FIG. 3a: an optical resonator with a small effective optical path length according to an embodiment of the invention;

FIG. 3b: an optical resonator with focusing elements in accordance with an embodiment of the invention; and FIG. 4: a flow chart of a method for multicolor optical imaging of a sample according to an exemplary embodiment of the invention.

DESCRIPTION OF THE PREFERRED EMBODIMENTS

FIG. 1 depicts a sectional view of a device 100 for multicolor optical imaging of a sample 102 according to an exemplary embodiment of the invention. The device 100 comprises a sample holder 104 for mounting the sample 102, wherein the sample 102 may e.g. be placed on or mounted to a substrate like a microscopy slide or may be provided in a fluid chamber. The device 100 further comprises a resonator 106, which in this example is formed by two mirrors 108 and 110 with parallel opposing reflective surfaces. The mirrors 108, 110 may for example comprise a metallic or dielectric coating on the reflective surfaces. In other examples, the reflective surfaces may be curved, e.g. convex or concave, more than two mirrors may be used, e.g. in a ring-type cavity, or the reflective surfaces may be integrated in the sample holder 104, e.g. opposing surfaces of a fluid chamber. The optical resonator 106 has an optical axis 112 forming a closed path in the resonator 106, along which light can propagate.

The device 100 comprises a first imaging system 114, which is configured to image the sample 102 at a first wavelength with a first imaging technique. For this, light of the first wavelength 116 may be coupled into the resonator 106, e.g. through the mirror 108 along an incoming optical axis 118, which is aligned to an outgoing optical axis 120 of the optical resonator 106. The first imaging system 114 is configured to perform the imaging along an outgoing optical axis 122 of the optical resonator 106, i.e. the outgoing optical axis 122 is parallel to an optical axis 124 of the first imaging system 114. In other examples, the optical axis 124 of the first imaging system 114 may be tilted by an angle, e.g. less than 5°, from the outgoing optical axis 122, such that the first imaging system 114 captures at least some of the light emitted from the optical resonator 106 along the outgoing optical axis 122. In other embodiments, the same outgoing optical axis may be used for imaging and coupling of light into the resonator 106.

The device 100 further comprises a second imaging system 126, which is configured to image the sample 102 at a second wavelength with a second imaging technique. For this, light of the second wavelength 128 maybe coupled into the resonator 106, e.g. through the mirror 108. The second imaging system 126 is configured to perform the imaging along an outgoing optical axis, e.g. the outgoing optical axis 122 of the optical resonator 106, i.e. the outgoing optical axis 122 is parallel to or tilted by a small angle, e.g. less than 5°, relative to an optical axis of the second imaging system 126.

The first 114 and second imaging system 126 may be configured to perform different imaging techniques. In the example shown in FIG. 1, the first imaging system 114 is configured to perform microscopy, e.g. absorption or fluorescence imaging, with a spatially resolving detector 130, e.g. a CCD or CMOS camera. For this, the first imaging system 114 can comprise additional optical elements, e.g. a lens 132. The second imaging system 126 is configured to perform spectroscopic measurements with a point-like detector, e.g. a photodiode 134 configured to measure an average light intensity. The first imaging system 126 can also comprise additional optical elements, e.g. a lens 136, and can furthermore share optical elements with the first imaging system, e.g. an objective 138. To separate the light of the first wavelength and light of the second wavelength, a wavelength-specific optical element may be used, e.g. a dichroic mirror 140. In other examples, a prism or diffraction grating may be used for this.

FIG. 2 shows an example of a transmission spectrum T(v) (200) as a function of the frequency v of the light for an optical resonator of a device in accordance with an embodiment of the invention, e.g. the optical resonator 106. Destructive interference between partial waves undergoing different numbers of round trips strongly suppresses transmission through the resonator 106 for most frequencies such that all incoming light is reflected off the resonator 106. If a resonance condition for constructive interference is fulfilled, e.g. if the length of the resonator 106, i.e. the length of a round trip along the optical axis 112, is an integer multiple of 242, wherein λ denotes the wavelength of the light, the partial waves interfere constructively and the optical resonator 106 becomes transmissive, i.e. transmits a large fraction of the light. This gives rise to a periodic succession of transmission peaks in the transmission spectrum 200, wherein the spacing between neighboring peaks is determined by a free spectral range 202 of the resonator 106. The free spectral range 202 correspondingly depends on the length of the resonator and is defined as the inverse of the round trip time of a photon in the resonator. Each of the transmission peaks has a width 204, which in turn is related to the average time a photon spends in the resonator 106 via the Fourier transform. Thus, the finesse of the resonator 106, which is defined as the ratio of the free spectral range 202 and the peak width 204, e.g. the full width at half maximum, characterizes an average number of round trips that a photon performs before leaving the resonator 106.

The finesse of the resonator 106 can be set to different values for the first and second wavelength. For example, the finesse may be larger at the second wavelength than at the first wavelength, i.e. the width 204 of the transmission peaks at the first wavelength compared to the free spectral range 202 is broader than the width 208 at the second wavelength compared to the free spectral range 206. In general, the free spectral range 206 is similar to the free spectral range 202 unless the resonator contains strongly dispersive elements.

FIG. 3a depicts an optical resonator 106 with a small effective optical path length in a device 300 according to an embodiment of the invention. The device 300 may be similar to the device 100 shown in FIG. 1, from which the device 300 mainly differs in the design of the optical resonator 106. Correspondingly, the device 300 may comprise other elements in addition to the components shown in FIG. 3a, e.g. the first imaging system 114 and the second imaging system 126. The sample 102 is placed in the resonator 106. When imaging the sample 102, e.g. through the objective 138, the repeated cycling of light in the resonator 106 through the sample 102 can be interpreted as creating ghost images 302 of the sample since in each cycle a small fraction of the light leaves the resonator and creates an image of the sample e.g. on the camera 130 (not shown in FIG. 3a). Due to diffraction of the light, the ghost images 302 may not be identical such that overlapping of the ghost images 302 on the camera 130 can reduce the sharpness of the image. This reduction can depend on an effective separation of the ghost images, which is determined by the effective optical path length 304 of the resonator and thus its finesse and length, and the depth of field 306 of the respective imaging system. Here, the depth of field 306 of the imaging system is defined as the Rayleigh length of a Gaussian laser beam 308 at the respective wavelength focused onto the sample 106, wherein the waist of the laser beam 308 at the focus is chosen such that the waist of the laser beam 308 at a first aperture of the imaging system as seen from the sample 102, in this case the first lens of the objective 138, is equal to the radius of the first aperture, e.g. the radius of the first lens. To enhance the image quality, the effective optical path length 304 may be chosen to be comparable to the depth of field 306, e.g. less than a factor of 2 larger than the depth of field 306. This can in particular be achieved by reducing the size of the optical resonator 106, such that the effective optical path length 304 remains small even if the finesse of the optical resonator 106 at the respective wavelength is large.

FIG. 3b depicts an optical resonator 106 with focusing elements in a device 310 in accordance with an embodiment of the invention. The device 310 may be similar to the device 100 shown in FIG. 1, from which the device 310 mainly differs in the design of the optical resonator 106. Correspondingly, the device 310 may comprise other elements in addition to the components shown in FIG. 3b, e.g. the first imaging system 114 and the second imaging system 126. Inside the optical resonator 106, two focusing lenses 312 and 314 are placed. The length of the resonator 106 is chosen such that it equals two times the sum of the focal lengths of the lenses 312 and 314, e.g. 4 f if f denotes the focal length of both lenses. In the example shown in FIG. 3b, the lenses 312 and 314 are placed such that a point on a surface of the left mirror 108 is imaged onto a point on a surface of the right mirror 110. Thus, after a complete round trip, an intensity pattern on the surface is imaged onto itself. This may allow for compensating a divergence of light propagating along the optical axis 112 of the resonator 106. If the sample 102 is positioned close to the surface of the mirror 108, e.g. at a distance smaller than 10%, preferably smaller than 5% of the focal length of the lens 312, a plane through the sample 102 can hence be imaged onto itself after one round trip as a virtual image 316 of the sample 102 is created close to the surface of the mirror 110, which is then imaged onto the sample 102 again after the light is reflected back by the mirror 110. In other embodiments, the mirrors 108 and 110 may be focusing elements and may have curved surfaces to focus the light. Furthermore, a different number of focusing element, e.g. lenses, may be placed inside the resonator 106.

In FIG. 4, a flow chart of a method 400 for multicolor optical imaging of a sample according to an exemplary embodiment of the invention is shown, which can e.g. be implemented with the device 100 and is described in the following with reference to FIG. 1. The method 400 can, however, also be implemented with other devices in accordance with an embodiment of the invention, e.g. the devices 300 and 310.

In step 402, the sample 102 is placed in the sample holder 104, e.g. by creating a flow of a liquid medium containing imaging objects through a fluid chamber of the sample holder 104. In step 404, which is preferably conducted after step 402 when the sample is already in place, the transmission through the optical resonator 106 can be tuned. In one example, the transmission spectrum 200 is measured at least in part and the frequencies v1 and v2 corresponding to the first and second wavelength, respectively, are set to desired points in the transmission spectrum 200, e.g. by tuning the first and/or second wavelength to shift the frequencies v1 and v2 or by changing the transmission spectrum 200 by adjusting a resonance frequency of the optical resonator 106, e.g. by changing its length. The frequencies v1 and v2 may for example both be set to different peaks in the transmission spectrum 200. In another example, v2 may be set to a peak in the transmission spectrum 200, whereas v1 may be set to a wing of another peak in the transmission spectrum 200, e.g. at a point at which the transmission is ⅓ of the transmission at the corresponding peak. In a third example, v1 may be set to the high frequency wing of a peak in the transmission spectrum 200, i.e. to the right of the peak, whereas v2 may be set to the low frequency wing of another peak in the transmission spectrum 200, i.e. to the left of the respective peak. This may e.g. be used to distinguish between a change in absorption by the sample 102 and a change of the optical path length of the resonator 106 created by the sample 102 since a change in absorption leads to simultaneous increase or decrease in transmission of both frequencies, whereas a change in the optical path length leads to a shift of the peaks in the transmission spectrum 200, resulting in an asymmetric change of the transmission at both frequencies.

Subsequently, in steps 406 and 408, the sample is imaged with the first imaging technique at the first wavelength and the second imaging technique at the second wavelength, e.g. by coupling the light of the first 116 and second wavelength 128 into the resonator 106 and measuring light transmitted through the resonator 106 via the first and second imaging systems 114 and 126, e.g. on the detectors 130 and 134. If a spectroscopic measurement is performed in one or both of the steps 406 and 408, this may involve tuning the first and/or second wavelength during the measurements, e.g. setting the respective wavelength to different peaks in the transmission spectrum 200. Steps 406 and 408 may be performed simultaneously or sequentially. In some embodiments, the transmission through the resonator 106 at the first and/or second wavelength may further be stabilized during steps 406 and 408, e.g. to keep an intensity at the sample or on a detector constant.

The embodiments of the present invention disclosed herein only constitute specific examples for illustration purposes. The present invention can be implemented in various ways and with many modifications without altering the underlying basic properties. Therefore, the present invention is only defined by the claims as stated below.

LIST OF REFERENCE SIGNS

100—Device for multicolor optical imaging
102—Sample
104—Sample holder
106—Optical resonator
108—Mirror
110—Mirror
112—Optical axis of the optical resonator
114—First imaging system
116—Light at the first wavelength
118—Incoming optical axis
120—Outgoing optical axis of the optical resonator
122—Outgoing optical axis of the optical resonator
124—Optical axis of the first imaging system
126—Second imaging system
128—Light at the second wavelength
130—Spatially resolving detector
132—Lens
134—Photodiode
136—Lens
138—Objective
140—Dichroic mirror
200—Transmission spectrum of an optical resonator
202—Free spectral range at the first wavelength
204—Width of a transmission peak at the first wavelength
206—Free spectral range at the second wavelength
208—Width of a transmission peak at the second wavelength
300—Device for multicolor optical imaging
302—Ghost images of the sample
304—Effective optical path length
306—Depth of field
308—Gaussian laser beam
310—Device for multicolor optical imaging 312—Lens
314—Lens
316—Virtual image of the sample
400—Method for multicolor optical imaging
402—Step of placing the sample in the optical resonator
404—Step of tuning the transmission through the optical resonator
406—Step of imaging the sample at first wavelength with first imaging technique
408—Step of imaging the sample at second wavelength with second imaging technique

The invention claimed is:

1. A device for multicolor optical imaging of a sample with wavelength-dependent optical path length enhancement, the device comprising:
an optical resonator for enhancing an optical path length, wherein the optical resonator has a first finesse at a first wavelength and a second finesse at a second wavelength;
a sample holder for mounting the sample in the optical resonator, wherein the sample holder is configured to hold the sample where an optical axis of the optical resonator intersects with the sample;
a first imaging system for imaging the sample at the first wavelength with a first imaging technique, wherein the imaging is to be performed along an outgoing optical axis of the optical resonator; and
a second imaging system for imaging the sample at the second wavelength with a second imaging technique, wherein the imaging is to be performed along an outgoing optical axis of the optical resonator and wherein the second wavelength is different from the first wavelength;
wherein, based on the first finesse and the second finesse, the optical resonator is to enhance a first image quality indicator of the imaging with the first imaging system and a second image quality indicator of the imaging with the second imaging system.

2. The device of claim 1, wherein each of the first image quality indicator and the second image quality indicator is a signal strength, a signal-to-noise ratio, a contrast ratio, an edge contrast or a combination thereof.

3. The device of claim 1, wherein each of the first and second imaging system is configured to perform at least one of the following imaging techniques: absorption imaging, phase contrast imaging, fluorescence imaging, polarization imaging, photoacoustic imaging, absorption spectroscopy, fluorescence spectroscopy or Raman spectroscopy.

4. The device of claim 3, wherein the first imaging technique is different from the second imaging technique.

5. The device of claim 1, wherein, based on the first finesse and the second finesse, the optical resonator is to enhance a combination of the first image quality indicator of the imaging with the first imaging system and the second image quality indicator of the imaging with the second imaging system compared to an optical resonator with the second finesse at the first wavelength and the first finesse at the second wavelength.

6. The device of claim 1, wherein one or more of the following conditions are fulfilled:
the first finesse is larger than 50;
the second finesse is smaller than 10; and
the first finesse and the second finesse are larger than 50 wherein the first and second wavelengths are separated by more than 50 nm.

7. The device of claim 1, wherein the optical resonator comprises a first and a second reflective surface and wherein, based on a reflectivity spectrum of one or both of the first and second reflective surfaces, the optical resonator is to exhibit the first and second finesse at the first and second wavelength, respectively.

8. The device of claim 1, wherein an effective optical path length of the optical resonator at one or both of the first and second wavelengths is smaller than five times the depth of field of the first and second imaging system, respectively.

9. The device of claim 1, wherein the optical resonator comprises at least one focusing element, wherein the at least one focusing element is configured to focus light propagating along the optical axis of the optical resonator wherein a plane perpendicular to the optical axis of the optical resonator is imaged onto itself.

10. The device of claim 9, wherein the optical resonator is configured to image a plane through the sample onto itself.

11. The device of claim 1, wherein an outgoing optical axis of the optical resonator is parallel to an optical axis for the imaging with one or both of the first and second imaging systems or tilted relative to an optical axis for the imaging with one or both of the first and second imaging systems by an angle of less than 15°.

12. The device of claim 1, wherein the sample holder comprises a fluid chamber configured to hold a liquid medium and the optical resonator is formed by two opposing surfaces of the fluid chamber.

13. The device of claim 1, wherein the device comprises one or both of:
a wavelength tuning apparatus, wherein the wavelength tuning apparatus is configured to adjust one or both of the first wavelength and the second wavelength; and
an adjusting mechanism for adjusting a resonance frequency of the optical resonator.

14. The device of claim 1, further comprising a third imaging system for imaging the sample with a third imaging technique, wherein the imaging is performed along an axis different from the outgoing optical axes of the optical resonator.

15. A method for multicolor optical imaging of a sample with wavelength-dependent optical path length enhancement using a device comprising:
an optical resonator for enhancing an optical path length, wherein the optical resonator has a first finesse at a first wavelength and a second finesse at a second wavelength;
a first imaging system for imaging the sample at the first wavelength with a first imaging technique; and
a second imaging system for imaging the sample at the second wavelength with a second imaging technique,
the method comprising:
placing the sample in the optical resonator, wherein the sample is placed where an optical axis of the optical resonator intersects with the sample;
imaging the sample at the first wavelength with the first imaging technique, wherein the imaging is performed along an outgoing optical axis of the optical resonator; and
imaging the sample at the second wavelength with the second imaging technique, wherein the imaging is performed along an outgoing optical axis of the optical resonator and wherein the second wavelength is different from the first wavelength,
wherein, based on the first finesse and the second finesse the optical resonator enhances the first image quality indicator of the imaging with the first imaging technique and the second image quality indicator of the imaging with the second technique system.

16. The method of claim 15, wherein each of the first and second imaging techniques is any one of the following imaging techniques: absorption imaging, phase contrast imaging, fluorescence imaging, polarization imaging, photoacoustic imaging, absorption spectroscopy, fluorescence spectroscopy or Raman spectroscopy.

17. The method of claim 16, wherein the first imaging technique is different from the second imaging technique.

18. The method of claim 15, wherein the device comprises a fluid chamber configured to hold a liquid medium with the optical resonator being formed by two opposing surfaces of the fluid chamber, the sample comprises a liquid medium containing imaging objects, and placing the sample in the optical resonator comprises providing the liquid medium in the fluid chamber.

19. The method of claim 15, wherein one or both of the following conditions are fulfilled:
  the first finesse of the optical resonator with the sample in place is larger than 20; and
  the second finesse of the optical resonator with the sample in place is smaller than 10.

20. The method of claim 15, further comprising adjusting one or more of the first wavelength, the second wavelength and a length of the optical resonator to tune a transmission of the optical resonator at the first wavelength relative to a transmission of the optical resonator at the second wavelength, wherein one or both of the first and second wavelengths is/are set to a peak of the transmission spectrum of the optical resonator.

\* \* \* \* \*